Jan. 2, 1962        T. E. BELING        3,015,777
SYSTEM FOR PROVIDING SHORT HIGH AMPLITUDE
SQUARE VOLTAGE PULSES
Filed Jan. 22, 1958
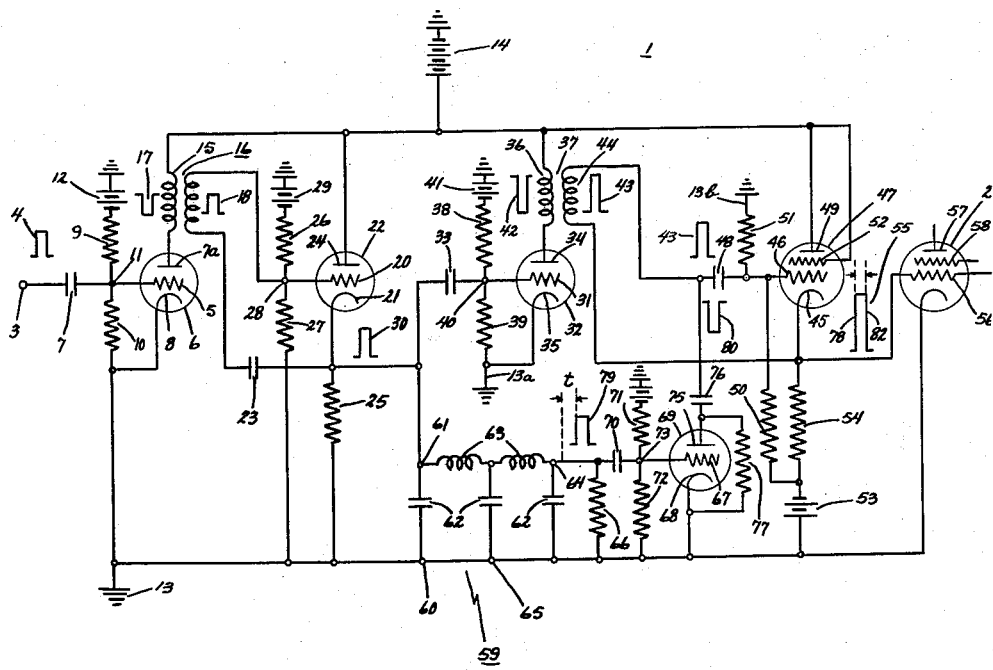
Inventor:
Thomas E. Beling,
by Just & Irish
Attorney.

United States Patent Office

3,015,777
Patented Jan. 2, 1962

3,015,777
SYSTEM FOR PROVIDING SHORT HIGH AMPLITUDE SQUARE VOLTAGE PULSES
Thomas E. Beling, Fort Wayne, Ind., assignor to International Telephone & Telegraph Corporation
Filed Jan. 22, 1958, Ser. No. 710,585
8 Claims. (Cl. 328—58)

This invention relates to pulse producing systems and more particularly to a system for producing short high amplitude voltage pulses of precise pulse length and having fast rise and fall time characteristics.

In certain radio transmitting systems which provide a pulsed signal, it is necessary to provide means for producing short rectangular voltage pulses for driving a modulator tube, which in turn modulates a carrier frequency to provide the pulsed output signal. In such a transmitting system employing a high vacuum, i.e., hard tube modulator which is to produce short pulses, for example in the millimicrosecond range, a modulator drive is required capable of producing short rectangular voltage pulses at a voltage and current level sufficient to drive the modulator tube grid; for example, with 1,000-volt pulses and at one to five amperes of grid current. It is, of course, highly desirable that the modulating pulse provided by the modulator tube have a substantially rectangular wave shape, i.e., with fast rise and fall time characteristics, and further that the pulse length be precisely maintained, i.e., not vary from one pulse to the next; this requirement in turn requires that the voltage pulses provided for driving the modulator tube have the same characteristics, i.e., fast rise and fall time characteristics and precise control of pulse length.

Sufficiently precise rectangular voltage pulses can be provided by conventional square wave generators; however, the output pulses of such generators are at relatively low level and contain insufficient power to drive modulator tubes of the transmitters here under discussion; it has thus been necessary to amplify the pulses provided by the pulse generator in order adequately to drive the modulator tube. In the past, such pulse amplifiers have employed gaseous discharge tubes, such as the hydrogen thyratron, or such circuits as the simple amplifying cathode follower, referred to as a "boot-strap" amplifier. The hydrogen thyratron, however, is limited in its anode current rate of rise and, further, there is an inherent time jitter in the output of the thyratron with reference to the trigger pulse; this time jitter of the thyratron is due to the fact that the tube does not fire at precisely the same grid voltage every time. The simple boot-strap driver, on the other hand, does not have an easily controllable pulse length and the fall time of the generated pulse is inherently poor. Thus, prior drivers for the modulator tube of pulsed radio transmitters did not provide driving pulses for the modulator tube with sufficiently fast rise and fall time characteristics and precise maintenance of pulse length.

It is therefore desirable to provide a system for producing short, high amplitude voltage pulses having fast rise and fall time characteristics and precise maintenance of pulse length, and with such a system being capable of producing pulses of ten (10) millimicroseconds or less duration with an amplitude of 1,000 volts or more. It is further desirable that such a system be operated in a cut-off state until the occurrence of the modulator trigger pulse in order to economize power. It is, of course, further desirable that the time jitter encountered in prior hydrogen thyratron driving circuits be eliminated.

My invention, in its broader aspects, therefore, includes an input circuit adapted to receive the trigger pulses and amplifying means having input and output circuits. The input circuit of the amplifying means is coupled to the pulse receiving circuit so that pulses are impressed on the amplifying input means in time coincidence with the input pulses and thereby initiate amplified output pulses in the amplifying means output circuit. Delay means is also provided coupled between the pulse receiving circuit and the amplifying means input circuit thereby to impress second voltage pulses on the amplifying means input circuit delayed by the delay time of the delay means from the first pulses and having a polarity opposite thereto so that the second pulses applied to the amplifier means input circuit terminate the output pulses, thereby providing output pulses having fast rise and fall times with a pulse length determined by the time delay of the delay means.

It is therefore an object of my invention to provide an improved system for producing short voltage pulses having fast rise and fall times.

Another object of this invention is to provide an improved system for producing short high amplitude voltage pulses having fast rise and fall times.

A further object of this invention is to provide an improved system for producing short high amplitude voltage pulses having fast rise and fall time characteristics and precise maintenance of pulse length.

Yet another object of this invention is to provide an improved system for producing short high amplitude voltage pulses having fast rise and fall time characteristics and precise maintenance of pulse length, and which is additionally economical in its power consumption.

A still further object of this invention is to provide an improved system for driving a hard tube modulator capable of producing pulses of ten (10) millimicroseconds or less duration, with an amplitude of 1,000 volts or more at one through five amperes of grid current with fast rise and fall time characteristics, negligible time jitter, accurate maintenance of pulse duration, and low input power consumption.

The above mentioned and other features and objects of this invention and the manner of attaining them will become more apparent and the invention itself will be best understood by reference to the following description of an embodiment of the invention taken in conjunction with the accompanying drawing, wherein:

The single figure of the drawing is a schematic circuit diagram showing the improved pulse producing system of my invention.

Referring now to the drawing, my improved pulse producing system, generally identified as 1, for driving a high vacuum or hard modulator tube 2 includes an input terminal 3 adapted to be connected to a suitable pulse generator for supplying short rectangular trigger pulses 4; as will be more fully explained hereinafter, it is only necessary that the input trigger pulses 4 have a suitably fast rise time since with my circuit, the decay time of the trigger pulses 4 is unimportant. The input terminal 3 is coupled to grid 5 of amplifier tube 6 by a suitable coupling capacitor 7, the amplifier tube 6 also having conventional plate and cathode elements 7a and 8 respectively. Grid 5 of amplifier tube 6 is normally biased to cut-off by means of a voltage divider comprising serially connected resistors 9 and 10 with their midpoint 11 connected between capacitor 7 and grid 5, the other end of resistance 9 being connected to the negative side of a suitable source of biasing potential, shown here as being battery 12, and the other end of resistance 10 being connected to ground 13, as shown; cathode 8 of amplifier 2 is also connected to ground 13 as shown.

The plate 7a of the amplifier tube 6 is connected to a suitable source of positive plate potential shown here as being battery 14, by serially connected primary winding 15 of output transformer 16. It is thus seen that a positive-going input or trigger pulse 4 will drive the grid 5 of amplifier tube 6 positive so that the tube 6 conducts heavily, thereby providing a negative-going pulse 17 across the primary winding 15 of output transformer 16 which in turn induces a positive-going pulse 18 in secondary winding 19.

The secondary winding 19 of output transformer 16 of amplifier 6 is coupled across the grid 20 and cathode 21 of tube 22 by means of a coupling capacitor 23. The plate 24 of tube 22 is connected to the positive source 14 of plate potential while the cathode 21 is connected to ground 13 by a cathode resistor 25. Grid 20 of tube 22 is normally biased to cut-off by a voltage divider comprising serially connected resistors 26 and 27 having their midpoint 28 connected to grid 20 with the other end of resistor 26 being connected to the negative side of a suitable source of bias potential, shown here as being battery 29, and with the other end of resistance 27 being connected to ground as shown. It will now be seen that the tube 22 and its associated circuitry form an amplifying cathode follower circuit, sometimes referred to as a "boot-strap" amplifier. It will be seen that the output of the secondary winding 19 of output transformer 16 is floating and thus the full output of secondary winding 19 is applied between the cathode 21 and grid 20 of tube 22. Thus, with a positive-going pulse 18 induced in secondary winding 19 of output transformer 16, grid 20 of tube 22 is driven positive and the tube conducts heavily, thus developing a substantial voltage drop across cathode resistor 25 to provide an amplified positive-going pulse 30.

The cathode 21 of the boot-strap amplifier tube 22 is connected to grid 31 of amplifier tube 32 by a coupling capacitor 33, tube 32 also having plate and cathode elements 34 and 35 respectively. Plate 34 of amplifying tube 32 is connected to the positive source of plate potential 14 by primary winding 36 of output transformer 37, while the grid 31 is normally biased to cut-off by means of a voltage divider including serially connected resistors 38 and 39 with their midpoint 40 connected to grid 31 and with the other end of resistor 38 connected to the negative side of a suitable source of biasing potential, shown here as battery 41, and with the other end of resistance 39 connected to ground 13 as shown; cathode 35 of amplifier 32 is likewise connected to ground 13 as shown. It will now be seen that the amplified positive-going pulse 30 developed in the output circuit of the boot-strap amplifier 32, i.e., across the cathode resistor 25, results in driving grid 31 of amplifier tube 32 positive, thereby causing tube 32 to conduct heavily and developing a negative-going pulse 42 in the primary winding 36 of output transformer 37; this in turn causes a corresponding positive-going pulse 43 to be developed in the secondary winding 44 of output transformer 37.

Secondary winding 44 of output transformer 37 is coupled across cathode 45 and grid 46 of amplifying cathode follower or boot-strap amplifier tube 47 by means of a coupling capacitor 48, the plate 49 of boot-strap amplifier tube 47 being connected to the positive source of plate potential 14. The grid 46 of the boot-strap amplifier tube 47 is likewise normally biased to cut-off by means of serially connected resistors 50 and 51 which apply a negative potential to grid 46 from the negative side of a source of biasing potential, shown as a battery 53, the negative potential applied to grid 46 being lower in magnitude than the negative potential applied to cathode 45 through resistor 54. Screen 52 of tube 47 is connected to an appropriate positive potential as shown. It will now be seen that the impressing of the positive-going pulse 43 induced in the secondary winding 44 of output transformer 37 across the grid 46 and cathode 45 of boot-strap amplifier tube 47 will drive the grid 46 positive, causing the tube 47 to conduct heavily thereby initiating output pulse 55 across cathode resistor 54; it will be seen that cathode 45 of boot-strap amplifier tube 47 is connected to the grid 56 of the modulator tube 2 which in turn has its plate 57 and another grid 58 connected in the transmitter circuitry, as is will known in the art.

In order to sharply terminate the output pulse 55, I provide a delay line, generally identified as 59, having its input terminals 60 and 61 connected to the output circuit of the boot-strap amplifier 22, i.e., across the cathode resistor 25. The delay line 59 provides a delay "*t*" equal to the desired duration of the output pulse 55, and may be formed of lumped capacitance elements 62 and inductance elements 63, or may in the alternative take the form of a suitable length of coaxial transmission line, as is well known in the art. In order to prevent reflections, the delay line 59 is terminated by its characteristic impedance 66, connected across output terminals 64 and 65, the output terminals 64 and 65 of delay line 59 being connected across grid 67 and cathode 68 of amplifier tube 69 by a coupling capacitor 70. Grid 67 of amplifier tube 69 is also normally biased to cut-off by a voltage divider comprising serially connected resistors 71 and 72 with their midpoint 73 connected to the grid 67 and with the other end of the resistance 71 connected to a suitable source of negative biasing potential, shown here as being battery 74, and with the other end of resistance 72 connected to ground 13 as shown; cathode 68 of amplifier 69 is also connected to ground 13 as shown. The plate 75 of the amplifier tube 69 is coupled to grid 46 of the output boot-strap amplifier tube 47 by means of coupling capacitor 76, and a shunting resistance 77 is connected between the plate 75 and cathode 68 as shown.

It will now be seen that the first input pulse 43 impressed across the cathode 45 and grid 46 of the output boot-strap amplifier 47 is in time coincidence and has the same polarity as the input or trigger pulse 4, and thus that the output pulse 55 has the same polarity as the trigger pulse 4 with its wave front 78 in time coincidence with the wave front of the trigger pulse 4. It will now further be seen that the positive-going pulse 30 in the output circuit of the first boot-strap amplifier 22 is applied to the delay line 59 and appears across the terminating impedance 66 as a positive-going pulse 79 delayed by time "*t*" from pulse 30. The delayed pulse 79 is impressed on the input circuit of amplifier 69 and appears as a negative-going pulse 80 applied to the grid of the output boot-strap amplifier 47, again delayed by time "*t*" from the first input pulse 43. The application of the amplified negative-going pulse 80 to the grid 46 of the output boot-strap amplifier 47 suddenly drives the grid 46 negative beyond cut-off, thus suddenly cutting off the flow of cathode-plate current of the tube 47 and thus suddenly terminating the output pulse 55 to provide the fast fall time 82; it is now seen that the duration of the pulse 55 is the time "*t*" determined by the time delay of the delay line 59.

It is now seen that both the rise and fall time of the output pulse 55 is provided by driving tubes into conduction, i.e., output boot-strap amplifier 47 in the case of the rise time of the output pulse 55 and the amplifier 69 in the case of the fall time. This results in a very fast rise and fall time of the output pulse 55 limited essentially only by the bandwidth of the output of pulse transformers 16 and 37 and the delay line 59. It will further be observed that all of the tubes in the circuit are normally cut-off thus conserving power, except during the incidence of a trigger pulse 4. It will now further be seen that the only essential component of the trigger pulse 4 is the wave front or rise time since it is the delayed pulse from the delay line 59 which terminates the output pulse 55; it will, however, be readily apparent that the delay time "*t*" provided by the delay line 59 cannot exceed the normal pulse length of the input or trigger pulse 4. It will further be observed that all time jitter is eliminated since forming of the output pulse 55, i.e., both its rise and fall characteristics are provided by driving tubes into conduction, as pointed out above, the tubes being employed all being hard tubes and thus not subject to the indefinite firing voltage characteristic of a gaseous discharge tube.

In an actual system constructed in accordance with FIG. 1, the following components and values were employed:

| | |
|---|---|
| Trigger pulse 4 | .2 microseconds and 50 volts. |
| Capacitor 7 | .01 microfarads. |
| Resistor 9 | 100,000 ohms. |
| Resistor 10 | 33,000 ohms. |
| Bias potential 12 | 150 volts. |
| Tube 6 | ½ 5687. |
| Plate potential 14 | 300 volts. |
| Capacitor 23 | .01 microfarads. |
| Resistor 26 | 100,000 ohms. |
| Resistor 27 | 33,000 ohms. |
| Bias potential 29 | 150 volts. |
| Tube 22 | ½ 5687. |
| Resistor 25 | 470 ohms. |
| Capacitor 33 | .01 microfarads. |
| Resistor 38 | 100,000 ohms. |
| Resistor 39 | 33,000 ohms. |
| Bias potential 41 | 150 volts. |
| Tube 32 | ½ 5687. |
| Capacitor 48 | .01 microfarads. |
| Resistor 51 | 10,000 ohms. |
| Resistor 50 | 100,000 ohms. |
| Resistor 54 | 1,000 ohms. |
| Tube 47 | 829B. |
| Bias potential 53 | 700 volts. |
| Delay line 59 | 100 millimicroseconds time delay. |
| Terminating impedance 66 | 500 ohms. |
| Capacitor 70 | .01 microfarads. |
| Resistor 71 | 100,000 ohms. |
| Resistor 72 | 33,000 ohms. |
| Biasing potential 74 | 150 volts. |
| Tube 69 | 5687. |
| Resistor 77 | 10,000 ohms. |
| Capacitor 76 | .01 microfarads. |
| Output pulse 55 | 100 millimicroseconds, 700 volts amplitude. |

It will now be seen that I have provided an improved system for producing short high amplitude voltage pulses having extremely fast rise and fall times and precise maintenance of pulse duration, the system operating with minimum power consumption and eliminating the time jitter and slow fall time of the output pulse provided by prior systems.

While I have described above the principles of my invention in connection with specific apparatus, it is to be clearly understood that this description is made only by way of example and not as a limitation to the scope of my invention.

What is claimed is:

1. A system for producing short, high amplitude voltage pulses having fast rise and fall times comprising: a first input circuit adapted to receive input voltage pulses having a fast rise time; amplifier means having input and output circuits; a first intermediate circuit connecting said first input circuit to said amplifier input circuit and arranged to impress first voltage pulses thereon respectively of the same polarity and in time coincidence with said input pulses, said amplifier means being normally non-conducting and being arranged to be driven into conduction responsive respectively to said first voltage pulses thereby initiating amplified output voltage pulses in said output circuit; a second intermediate circuit connecting said first input circuit to said amplifier means input circuit and including delay means having a predetermined time delay and phase inversion means thereby to impress on said amplifier means input circuit second voltage pulses delayed by said predetermined time from said first pulses and of opposite polarity; said amplifier means being cut-off responsive to said second pulses thereby terminating said output pulses to provide output voltage pulses in said output circuit having fast rise and fall times with a pulse length determined by the delay time of said delay means.

2. A system for producing short, high amplitude voltage pulses having fast rise and fall times comprising: a first input circuit adapted to receive input voltage pulses having a fast rise time; a boot-strap amplifier circuit having input and output circuits, said amplifier circuit being normally nonconductive, said first input circuit being coupled to said amplifier input circuit thereby impressing first pulses thereon in time coincidence with said input pulses, said amplifier circuit producing output pulses in said output circuit thereof responsive to said first pulses; delay line means having its input terminals coupled to said first input circuit and having a predetermined time delay; and means coupling the output terminals of said delay line means to said amplifier input circuit and including means for impressing thereon second pulses delayed from said first pulses by said predetermined time delay and having the opposite polarity, said amplifier circuit being cut-off responsive to said second pulses thereby providing output pulses having fast rise and fall time with a pulse length determined by the delay time of said delay line means.

3. A system for producing short, high amplitude voltage pulses having fast rise and fall times comprising: an input amplifier having an input circuit adapted to receive input voltage pulses having a fast rise time and having an output circuit arranged to provide pulses of the same polarity as said input pulses; an output amplifier having an input circuit coupled to said input amplifier output circuit whereby first voltage pulses of the same polarity and in time coincidence with said input pulses are impressed on said output amplifier input circuit, said output amplifier having an output circuit, said output amplifier being normally nonconducting and being driven into conduction responsive to said first pulses thereby to initiate output voltage pulses in said output amplifier output circuit, said output amplifier output circuit being arranged so that said output voltage pulses have the same polarity as said input pulses; a delay line having its input terminals coupled to said input amplifier output circuit and having a predetermined time delay; and a third amplifier having its input circuit coupled to the output terminals of said delay line and having an output circuit coupled to said output amplifier input circuit thereby impressing second voltage pulses thereon delayed from said first pulses by said predetermined time, said third amplifier output circuit being arranged so that said second voltage pulses are of opposite polarity from said first pulses; said output amplifier being arranged to be cut-off by said second voltage pulses thereby terminating said output pulses to provide output voltage pulses having fast rise and fall times with a pulse length determined by the delay time of said delay line.

4. A system for producing short, high amplitude voltage pulses having fast rise and fall times comprising: an input amplifier having an input circuit adapted to receive positive-going input voltage pulses having a fast rise time and having an output circuit arranged to provide pulses of the same polarity or said input pulses; an output amplifier including a vacuum tube having cathode and control grid elements; an input circuit for said output amplifier connected across said cathode and grid and coupled to said input amplifier output circuit whereby first voltage pulses of the same polarity and in time coincidence with said input pulses are impressed across said output amplifier cathode and grid, said output amplifier having a resistance connected in series with said cathode with an output circuit connected thereacross, said tube being normally cut-off and being driven into conduction by said first pulses thereby initiating amplified voltage pulses having the same polarity as said input pulses in said output amplifier output circuit; a delay line having its input terminals coupled to said input amplifier output circuit and having a predetermined time delay, said delay line being terminated by its characteristic impedance; and a third amplifier having its input circuit coupled to the output terminals of said delay line and having an output circuit connected to said output amplifier tube grid thereby impressing second voltage pulses thereon delayed from said first pulses by said predetermined time, said third amplifier output circuit being arranged so that said second voltage pulses are of opposite polarity from said first pulses; said output amplifier tube being driven to cut-off by said second voltage pulses thereby terminating said output pulses to provide output voltage pulses having fast rise and fall times with a pulse length determined by the delay time of said delay line.

5. A system for producing short, high amplitude voltage pulses having fast rise and fall times comprising: an input amplifier having an input circuit adapted to receive input voltage pulses having a fast rise time and having an output circuit, a first boot-strap amplifier circuit having an input circuit coupled to said input amplifier output circuit and having an output circuit; an intermediate amplifier having an input circuit coupled to said first boot-strap amplifier output circuit and having an output circuit; an output boot-strap amplifier circuit having an input circuit coupled to said intermediate amplifier output circuit whereby first pulses in time coincidence with said input pulses are impressed on said output boot-strap amplifier input circuit, said output boot-strap amplifier having an output circuit and being arranged to initiate output voltage pulses responsive to impressing said first pulses on the input circuit thereof; a delay line having its input terminals coupled to said first boot-strap amplifier output circuit and having a predetermined time delay; and means coupling the output terminals of said delay line to said output boot-strap amplifier input circuit for impressing thereon second pulses delayed from said first pulses by said predetermined time and having a polarity opposite from said first pulses; said output boot-strap amplifier being arranged to terminate said output pulses responsive to said second pulses thereby providing output pulses having fast rise and fall times with a pulse length determined by the delay time of said delay line.

6. A system for producing short, high amplitude voltage pulses having fast rise and fall times comprising: an input amplifier having an input circuit adapted to receive input voltage pulses having a fast rise time and having an output circuit arranged to provide pulses of the same polarity as said input pulses, a first boot-strap amplifier circuit having an input circuit coupled to said input amplifier output circuit and having an output circuit arranged to provide pulses of the same polarity as said input pulses; an intermediate amplifier having an input circuit coupled to said first boot-strap amplifier output circuit and having an output circuit arranged to provide pulses of the same polarity as said input pulses; an output boot-strap amplifier circuit having an input circuit coupled to said intermediate amplifier output circuit whereby first pulses in time coincidence with said input pulses and of the same polarity are impressed on said output boot-strap amplifier input circuit, said output boot-strap amplifier having an output circuit and being arranged to initiate output voltage pulses responsive to impressing said first pulses on the input circuit thereof, said output boot-strap amplifier output circuit being arranged so that said output voltage pulses have the same polarity as said input pulses; a delay line having its input terminals coupled to said first boot-strap amplifier output circuit and having a predetermined time delay; a second intermediate amplifier having an input circuit coupled to the output terminals of said delay line and having an output circuit coupled to said output boot-strap amplifier input circuit whereby second pulses delayed from said first pulses are impressed on said output boot-strap amplifier input circuit, said second intermediate amplifier output circuit being arranged so that said second pulses have a polarity opposite from said first pulses; said output boot-strap amplifier being arranged to terminate said output pulses responsive to said second pulses thereby providing output pulses having fast rise and fall times with a pulse length determined by the delay time of said delay line.

7. A system for producing short, high amplitude voltage pulses having fast rise and fall time comprising: an input amplifier having a vacuum tube with control grid and plate elements and with said control grid being adapted to receive positive-going input voltage pulses having a fast rise time; said input amplifier including an output transformer having primary and secondary windings with said primary winding connected in series with said plate element whereby pulses having the same polarity as said input pulses are provided across said secondary windings; a first boot-strap amplifier circuit including a second vacuum tube having cathode and control grid elements with said secondary winding of said input amplifier output transformer being coupled thereacross, said first boot-strap amplifier tube having a resistor connected in series with said cathode thereof whereby pulses having the same polarity as said input pulses appear thereacross; an intermediate amplifier having a third vacuum tube with control grid and plate elements and with said control grid being coupled to said first boot-strap amplifier tube cathode, said intermediate amplifier including a second output transformer having primary and secondary windings with said primary winding thereof being connected in series with said plate element of said third tube whereby pulses having the same polarity as said input circuit are provided across said second output transformer secondary winding; an output boot-strap amplifier circuit including a vacuum tube having a cathode and grid elements with said second output transformer secondary winding coupled thereacross thereby impressing on said output boot-strap amplifier first pulses in time coincidence with said input pulses, said output boot-strap amplifier tube having a resistance connected in series with said cathode element thereof and being driven into conduction responsive to said first pulses thereby initiating output pulses having the same polarity as said input pulses across said output boot-strap amplifier tube cathode resistance; a delay line having its input terminals connected across said first boot-strap amplifier cathode resistance and having a predetermined time delay, said delay line being terminated in its characteristic impedance; another intermediate amplifier having a fifth vacuum tube with control grid and plate elements and with said control grid thereof coupled to the output terminals of said delay line, said fifth tube having said plate element thereof coupled to said output boot-strap amplifier tube control grid and being driven into conduction by pulses from said delay line thereby impressing second voltage pulses on said output boot-strap amplifier tube control grid delayed from said first pulses by said predetermined time and having the opposite polarity therefrom; said output boot-strap amplifier being driven to cut-off by said second pulses thereby terminating said output pulses responsive thereto to provide output voltage pulses having fast rise and fall times with a pulse length determined by the time delay of said delay line.

8. A system for producing short, high amplitude voltage pulses having fast rise and fall times comprising a normally non-conductive amplifier having an input circuit and an output circuit, a source of unidirectional pulses, a first circuit coupled between said source and said input circuit to render said amplifier conductive in response to said unidirectional pulses to initiate said voltage pulses in said output circuit, and a second circuit including means to delay said unidirectional pulses and means to invert said unidirectional pulses coupled between said source and said input circuit to render said amplifier nonconductive in response to the delayed and inverted pulse output of said second circuit to terminate said voltage pulses in said output circuit.

References Cited in the file of this patent

UNITED STATES PATENTS

| | | |
|---|---|---|
| 2,188,970 | Wilson | Feb. 6, 1940 |
| 2,309,525 | Mohr | Jan. 26, 1943 |
| 2,472,209 | Hall | June 7, 1949 |
| 2,503,909 | Hollingsworth | Apr. 11, 1950 |
| 2,572,080 | Wallace | Oct. 23, 1951 |
| 2,700,156 | Sunstein | Jan. 18, 1955 |
| 2,709,746 | Page | May 31, 1955 |
| 2,752,490 | Rothstein | June 26, 1956 |

FOREIGN PATENTS

| | | |
|---|---|---|
| 667,481 | Great Britain | Mar. 5, 1952 |